United States Patent [19]
Popeil

[11] 3,798,825
[45] Mar. 26, 1974

[54] SELF THREADING CASTING BOBBER
[75] Inventor: Samuel J. Popeil, Chicago, Ill.
[73] Assignee: Popeil Brothers, Inc., Chicago, Ill.
[22] Filed: Dec. 14, 1972
[21] Appl. No.: 315,019

[52] U.S. Cl. ............................................. 43/44.9
[51] Int. Cl. ......................................... A01k 93/00
[58] Field of Search................ 43/44.9, 44.91, 44.87

[56] References Cited
UNITED STATES PATENTS

| | | | |
|---|---|---|---|
| 3,733,734 | 5/1973 | Hysaw.................................. | 43/44.9 |
| 2,712,194 | 7/1955 | Di Stefano......................... | 43/44.9 X |
| 3,269,047 | 8/1966 | Slattery............................. | 43/44.91 X |
| 2,223,823 | 12/1940 | Hampton........................... | 43/44.9 X |
| 1,489,088 | 4/1924 | McMindes........................... | 43/44.9 |
| 3,161,982 | 12/1964 | Lee................................... | 43/44.91 X |
| 3,303,598 | 2/1967 | Spindler............................. | 43/44.9 |
| 3,392,475 | 7/1968 | Vakodsky, Jr....................... | 43/44.9 |

*Primary Examiner*—James H. Czerwonky
*Attorney, Agent, or Firm*—Dominik, Knechtel, Godula & Demeur

[57] ABSTRACT

A self threading casting bobber is disclosed for use with a fishing line which has an elongate buoyant body member having an internal, co-extensive line guide threading tube passing through the longitudinal axis of the body and terminating within a counterbored knot end plug at one end. The knot end plug has a line hole proportioned to pass the line, but not a knot tied in the line. After a knot is tied at a preselected position on the line it is then positioned in the line hole of the knot plug and then by pushing the line its end self threads through the guide tube and through the bobber and out its lower end and then secured with a hook, sinker, or leader or other fishing elements as the fisherman may prefer. A sinker end plug may also be employed at the opposite end of the self threading casting bobber in self threading engagement with the line guide tube. Ideally the length of the unit is at least three times its largest transverse dimension, in the preferred embodiment the cross section being circular, with a ridge line in the center defining the approximate flotation level when in use.

10 Claims, 7 Drawing Figures

PATENTED MAR 26 1974

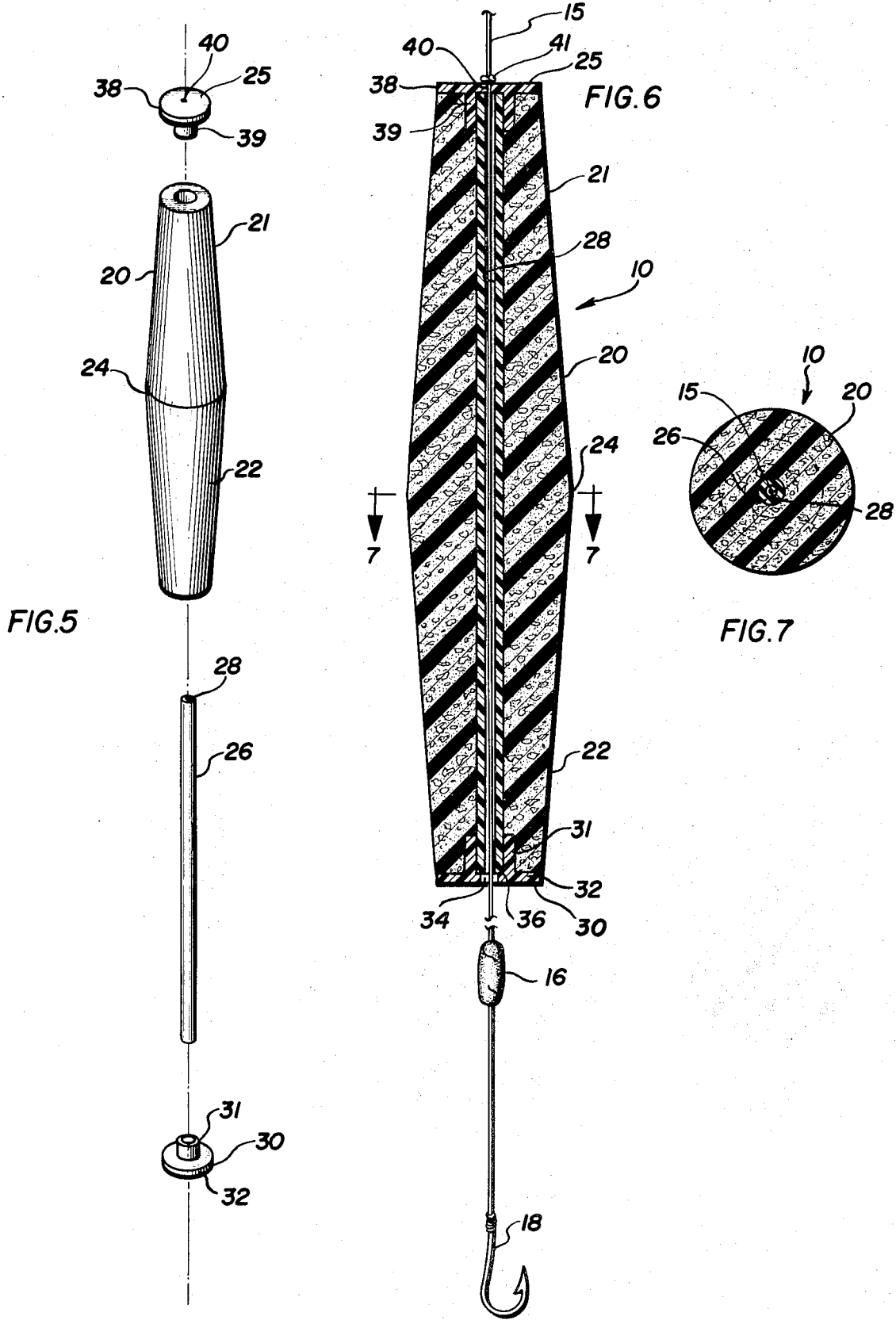

SELF THREADING CASTING BOBBER

CROSS REFERENCE TO RELATED APPLICATIONS

The subject self threading casting bobber finds unique utility along with the fishing rig of applicant's related application Ser. No. 269,815 filed July 7, 1972. The subject fishing bobber is particularly useful in the environment of the aforementioned application since it will fit within the small tackle box which forms a portion of the upper handle thereby completing the rig in readiness for fishing in its unitary form.

BACKGROUND OF INVENTION

1. Field of Invention

The present invention relates specifically to bobbers used for floating or buoying a fishhook and sinker at a preselected depth. More particularly, it relates to that type of bobber which is aerodynamically proportioned to permit casting the same, and yet after cast into position, it will support a baited hook at a preselected depth.

2. Description of the Prior Art

Fishing bobbers have been known for years. Initially they were corks, and the line secured to the cork by means of a pin or staple. More recently, fishing bobbers with spring loaded metallic elements have been employed in which the line passes through an eyelet at one end, and a hook at the other, thereby permitting the setting of the bobber to a preselected depth. Elongate bobbers are also known, but in these units the line is normally securely fixed to the bobber. In those instances where a preselected depth is sought, often a knot may be tied in a line, and then a bead positioned below the knot in order to engage the bobber after the same has been cast in place and the sinker and hook dropped to their preselected depth. After tying the knot at some distance from the end of the line, the prior art bobbers become difficult to thread. Further disadvantages of the prior art bobbers are that they do not provide for a low aerodynamic profile, compactness, a minimum of parts, and the ability to cast at significant distances while reserving a high degree of flexibility in determining the preselected depth to which the baited hook will sink after the casting process is completed.

SUMMARY

The present invention is directed to a self threading casting bobber having an elongate buoyant body member, and a line guide threading tube passing through the longitudinal axis of the bobber with an interior bore hole slightly larger than the line being used. A knot end plug is provided at the upper portion of the buoyant body member, preferably in press fit relationship with the guide threading tube, and having a knot hole at its center portion which is sufficiently large to pass the line, but not when the line has a knot positioned in it to thereby determine the preselected depth to which the sinker and hook will sink. The knot end plug is secured to the guide threading tube in self threading relationship. A sinker end plug may also be provided to finish both ends of the bobber in a generally similar configuration. A preferential body configuration is one with a cross sectional circular pattern, tapering from a center ridge line to the diammetrical proportion of the knot end plug and sinker end plug.

A principal object of the present invention is to provide a self threading casting bobber which is easy to thread, rig, and adjust and which is aerodynamically clean and permits long casts, but at the same time permits a wide range of preselection of the depth to which a related baited hook and sinker will sink.

Still another object of the present invention is to provide a self threading casting bobber which, at the time of casting, may be positioned on the line in close proximity to the sinker, hook, and swivel. Thus only a short string of tackle extends at the end of the line when casting. But because only a know is required to predetermine the depth, the knot may be wound on the spinning reel prior to casting thereby insuring an effective and long cast with the short string of tackle close to the eyelet at the end of the rod.

Still another object of the present invention is to provide a self threading casting bobber with the advantages set forth above which is inexpensive to manufacture, easy to see in operation, and effective in supporting a hook and sinker.

DESCRIPTION OF ILLUSTRATIVE DRAWINGS

Further objects and advantages of the present invention will become apparent as the following description of the illustrative drawings proceeds in which:

FIG. 5 is an exploded perspective view showing the principal elements of the subject self threading casting bobber.

FIG. 6 is a longitudinal sectional view in enlarged scale of the self threading casting bobber shown in FIG. 5 with all of the parts in assembled relationship taken along section line 6—6 of FIG. 3.

FIG. 7 is a transverse sectional view of the self threading casting bobber taken along section line 7—7 of FIG. 6.

Figure 1:
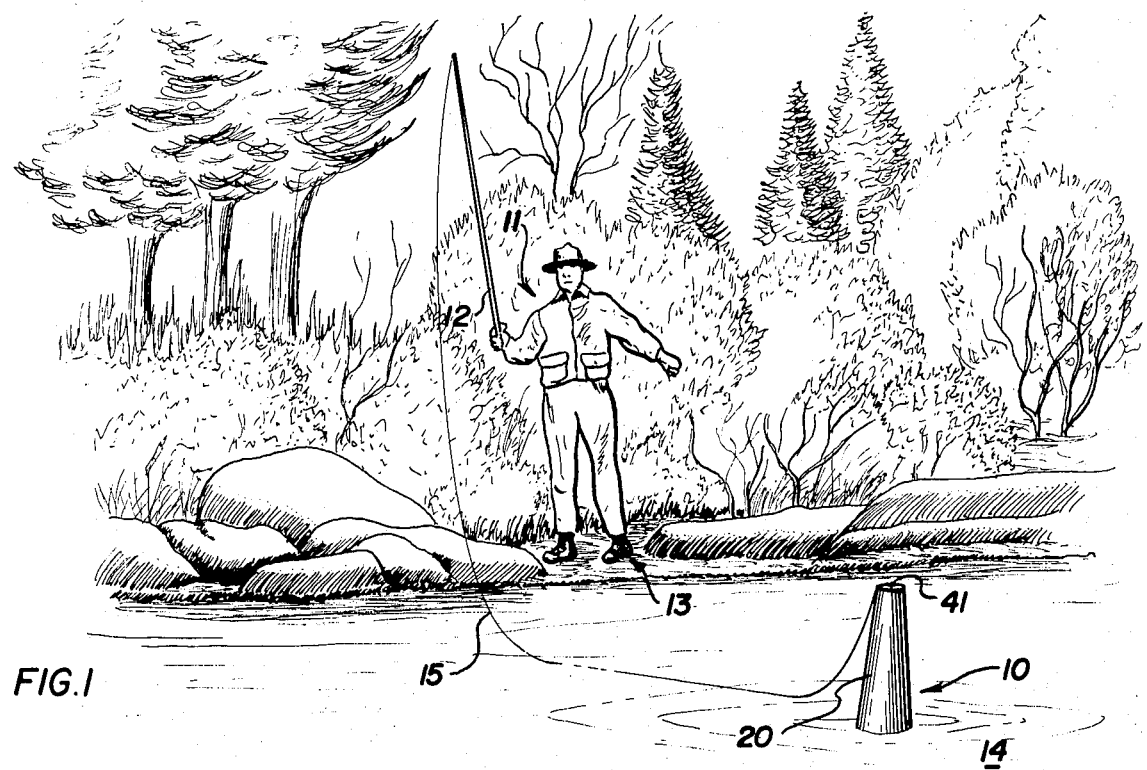
FIG. 1 is a diagrammatic view of the fisherman and the subject self threading casting bobber in a typical environmental situation.

The subject self threading casting bobber 10 is shown in FIG. 1 where it will be seen that the fisherman 11 is holding a fishing rod 12 while standing on the shoreline 13. He has cast the bobber 10 into the water 14, being secured by the line 15. While the fisherman 11 is shown with a conventional spin casting outfit, it will be appreciated that shorter units such as the "Pocket Fisherman" as marketed by applicant's assignee may also be used with this type of bobber. One of the many unique features of the subject self threading casting bobber 10 is the fact that the line 15 passes entirely through the body 20 of the bobber 10 and not around the body 20 of the bobber 10. As shown in FIG. 1, the knot 41 in the line 15 determines the depth to which the balance of the fishing paraphernalia will sink.

For more specific illustration, it should be observed in FIG. 6 that the line 15 contains a knot 41 which secures the line 15 atop the end plate 38 of the knot end plug 25, and yet passing through the knot hole 40 of the knot end plug 25. The lower end of the line 15 is normally provided with a sinker 16, and a hook 18 as shown in the lower portion of FIG. 6. A leader, swivel hook, and the like, may also be employed between the sinker 16 and the hook 18, but have not been shown here for purposes of simplification and reducing the elements to their minimum requirements for the successful utilization of the subject self threading casting bobber 10.

The component parts of the self threading casting bobber 10 are best shown in FIG. 5 where it will be seen that the body 20 is an elongate member, here shown as circular in cross section and having an upper half 21 and a lower half 22. The upper half and lower half 21, 22 meet at a center ridge 24, and the body is preferably proportioned so that the length is at least three times the diameter. In a successful commercial embodiment, the length of the bobber is 3-½ inches, and the cross section at the center ridge 24 has a diameter of 11/16 inch. The diameter at the two end plugs 25, 30 is approximately 7/16 inch.

The knot end plug 25, shown at the upper portion of FIG. 5, includes a knot hole 40 at the center portion which is proportioned to thread the line 15 in close fitting relationship through the knot hole 40, but refusing to pass the line knot 41 (as illustrated in the top of FIG. 6). The knot end plug 25 has a circular end plate 38 as shown, and a tube nest 39 extending from a lower portion, the tube nest 39 being provided with a central socket opening which receives the upper end of the line guide thread tube 26, which is imperforate and uninterrupted, shown beneath the body 20 in the exploded view of FIG. 5. The knot end plug 25 is secured in self threading relationship with the guide 26. More particularly, as noted in the upper portion of FIG. 6, the upper end of the line guide tube 26 is press fittingly engaged within the tube nest 39, and the center bore 28 of the line guide tube 26 is in line threading communication with the knot hole 40 at the center of the knot end plug 25.

At the lower end of the body 20 of the self threading casting bobber 10, the sinker end plug 30 is provided to also present a tube nest 31, having a counterbore, for the press fitting engagement of the lower end of the line guide tube 26 within the tube nest 31. A larger line hole 34 is provided at the end plate 32, and more particularly its center portion, so that the line 15 will readily pass through the lower end of the self threading casting bobber 10. The line guide tube 26 abuts against a ring defined by the base of the tube nest 31 in self threading relationship with the line hole 34 of the sinker end plug 30. The sinker end plug 30 has a circular end plate 32 with a tube nest 31 as defined, and press fittingly engages the lower end of the body 20.

The dimensional relationships can be further appreciated in terms of tolerances by reference to FIG. 7 where it will be seen that the line 15 is at the center portion of the line guide tube 26 within the line guide tube bore 28. The dimensions of the end plug plates 38 and the tube socket portions of the end plugs are shown in dotted lines in FIG. 7.

Figure 2:
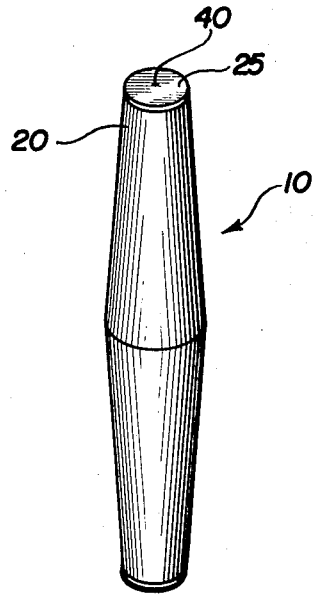
FIG. 2 is a perspective view of the illustrative self threading casting bobber.
Figure 3:
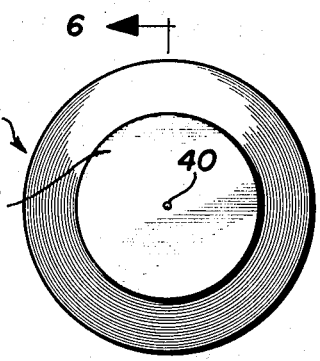
FIG. 3 is an end view of the upper end of the self threading casting bobber shown in FIG. 2 in enlarged scale.
Figure 4:
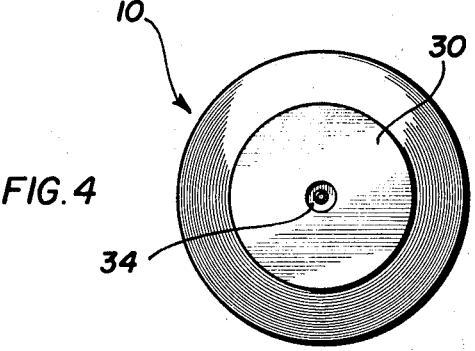
FIG. 4 is a bottom view of the self threading casting bobber shown in FIG. 3 in the same scale as FIG. 3.

When casting using the subject self threading casting bobber 10, it will be appreciated that like the configuration shown in FIG. 6, the bobber 10 will slide down the line 15 until it is engaged by the sinker 16, or any other element at the lower portion of the line 15, where the fish hook and related gear are positioned. This puts the self threading casting bobber 10 in close proximate relationship to the heavier portions of the fishing gear including the sinker, leader if any, and baited hook. Thus when casting, all of the weight is in a relatively confined area. As will be particularly observed in FIGS. 2, 3, and 4, the body 20 of the self threading casting bobber 10 is long and streamlined, and when whipped through the air offers a minimum of resistance to the casting. On the other hand, after the bobber has dropped into the water (just as shown in FIG. 1) there is sufficient slack line 15 so that the weight of the sinker 16 and hook 18 carry the line downwardly through the bobber line guide tube 26 until the knot 41 engages the top of the knot end plug 25, and thereafter predetermines the exact depth to which the hook 18 will sink. The relationship between the weight of the sinker, hook, and bait and buoyancy of the self threading casting bobber 10 is carefully proportioned. Too heavy a sinker will sink the bobber 10. Too light a sinker will fail to carry the hook and bait to the proper depth.

Another significant advantage in using the self threading casting bobber 10 such as illustrated with a knot 41 in the line 15 is that when the same is resting in the water 14, as shown in FIG. 1, there is no weighty bead or other element at the upper end of the body 20 to topple the same. On the contrary, the weight ot the bait and fish hook 18 along with the sinker 16 pull downwardly and thereby urge the self threading casting bobber 10 into an upright position as shown in FIG. 1. This further assists the fisherman in determining when a light bite is being experienced, and it further permits the upper portion of the body 20 of the self threading casting bobber 10 to remain high in the water, thereby giving a more dramatic visual presentation of the action of a fish at the baited hook 18. It will be further appreciated that various colors can be employed on the body, including dayglow paint, which makes it even additionally noticeable to the fisherman whatever action is taking place at the hook 18.

In a successful commercial embodiment, the body 20 of the self threading casting bobber 10 is formed of sytrofoam having a bulk density of 38 lbs./cu. ft. expanded to 9.6 lbs. density and sold under the trademark DYLITE by Sinclair-Koppers Co. The body 20, when molded, including the center bore to receive the line guide tube 26 as well as the tube nests 31, 39 of the end plugs 25, 30 weighs exactly 2.35 grams. The end plugs 25,30 are formed of DuPont nylon 101 with a specific gravity of 1.14. The line guide tube 26, which is formed of ABS* (acrylon-butadiene-styrene-nitrile) plastic, weighs approximately 0.60 grams having a specific gravity of 1.04, and each of the end plugs weigh approximately 0.12 grams. The total unit, when painted with dayglow paint, including body 20, line guide tube 26, knot end plug 25, and sinker end plug 30, weighs exactly 3.28 grams. The dimensions of the assembled unit are overall length 3.500 (3-½) inches, maximum diameter at the center 0.687 (11/16) inch, minimum diameter at the end plugs 0.425 inch, and a line hole 40 in the knot end plug 25 having a diameter of 0.020 inch, the same being proportioned for use with a 10-lb. monofilament line 15 having a diameter of 0.012 inch. The bore 28 of the line guide tube 26 has a diameter of 0.040 inch, the same also being used with the 10-lb. monofilament line 15 having a diameter of 0.012 inch. Since the knot hole 40 is half the diameter of the guide tube bore 28, the tolerance between the line 15 and the line hole 40 is significantly less than that of the line 15 and the bore 28 of the line guide 26.

The ratio of the weight of the sinker 16 along with the hook and swivel to the self threading casting bobber 10 is critical. If the sinker weight is too heavy, it will sink the entire unit, whereas if it is too light, the bobber body 20 will tend to float horizontally on the water. In a successful commercial embodiment the sinker weight is 4.40 grams, the hook weight with a snell is 0.17 grams, and the swivel and snap weight 0.45 grams, making a total weight of 5.02 grams for the fishing paraphernalia without the bait. This weight should be compared to the self threading casting bobber 10 which weighs 3.28 grams, or slightly less than that of the fishing paraphernalia making a total weight of the bobber, hook, sinker, swivel and snap of 8.28 grams. Thus the bobber should weigh slightly less than half the weight of the combined fishing gear and bobber 10.

In use it will be appreciated that the line 15 is always threaded through the line hole 40 at the knot end plug 25. This is the smallest diameter. It will be further observed that the bore 28 of the line guide 26 is sufficient to permit close guidance of the end of the line 15 until it passes through the other end of the line guide 26, and through the enlarged line hole 34 in the sinker end plugs 30. Once the lower end of the line passes through the line hole 34 in the sinker end plug 30, it can be readily grasped by the fingers and threaded through. Desirably the knot 41 is tied prior to threading the line 15 through the line guide 26, but it will be further appreciated that if this is not done, it is still possible to place a knot 41 in the line after the same has been threaded and the sinker 16 and hook 18 secured to the line.

In review it will be seen that a self threading casting bobber 10 has been disclosed and described in which an irreducible minimum number of fishing elements need be employed in order to gain the advantages of long casting, and preselected depth to which the baited hook will drop. Furthermore, the body 20 of the subject self threading casting bobber 10 is streamlined, and in close proximate relationship on the fishing line 15 to the hook 18 and sinker 16 so that a maximum concentration of weight is at the end of the line 15 permitting long casts. Finally, because only a knot 41 in the line 15 is employed to determine the depth to which the sinker 18 will drop, there are no weighty parts at the upper portion of the self threading casting bobber 10 to prevent the same from floating high in the water, and straight in the water, thereby permitting the fisherman an excellent indication of what action is impending on the baited hook.

Although particular embodiments of the invention have been shown and described in full here, there is no intention to thereby limit the invention to the details of such embodiments. On the contrary, the intention is to cover all modifications, alternatives, embodiments, usages and equivalents of a casting bobber as fall within the spirit and scope of the invention, specification and the appended claims.

What is claimed is:

1. A self threading casting bobber comprising, in combination,
   an elongate buoyant body member,
   an imperforate uninterrupted line tube secured interiorly of the body and having a bore through which a fishing line will pass, said tube having a length substantially equal to that of said body member, and
   a knot end plug having a tube nest counterbore portion proportioned to nestingly receive one end of the line tube and being mounted in and abutting one end of the body in self threading engagement, the interior diameter of said counterbore portion being substantially equal to the exterior diameter of said tube, said end plug including an outer plate having a hole passing therethrough, the diameter of said hole being substantially equal to that of the fishing line and being proportioned to pass the fishing line but block the passage of a knot placed in the line, said outer plate having an exterior diameter substantially equal to that of said one end of said body member, whereby a fishing line may be knotted to determine the depth to which a line, hook, and sinker may be buoyed by the body and the line threaded through the knot hole and line tube and then fitted with a sinker and hook.

2. In the bobber of claim 1,
   a sinker end plug flush with one end of the body forming the end of the bobber opposite the knot end plug.

3. In the bobber of claim 2,
   each end plug having a tube nest counterbore portion to press fittingly engage the opposite ends of the line tube in line self-threading engagement.

4. In the bobber of claim 2,
   said sinker end plug having a line hole larger than the knot end plug line hole to assist in passing a frayed end of the line when threading the line onto the bobber.

5. In the bobber of claim 4,
   said body having a length of at least three times its largest diameter.

6. In the bobber of claim 1,
   said buoyant body being formed from a material having a density volume of substantially 10 lbs. per cubic foot.

7. In the bobber of claim 4,
   said buoyant body having its largest cross section at the center and tapering uniformly therefrom to its respective ends.

8. In the bobber of claim 7,
   said bouyant body material being formed, proportioned, and selected in combination to permit the bobber, when in use, to float with a water level at approximately the major cross section.

9. In the bobber of claim 8,
   said bobber body having a circular cross section.

10. In the bobber of claim 2,
    each end plug having an outer plate, whereby said opposed plugs and plates form the two ends of the bobber.

* * * * *